(12) United States Patent
Nagaoka et al.

(10) Patent No.: US 7,041,247 B2
(45) Date of Patent: May 9, 2006

(54) INJECTION AND COMPRESSION MOLDING WITH PARALLELISM MECHANISM

(75) Inventors: Tsutomu Nagaoka, Shinagawa-ku (JP); Toshiaki Hotaka, Chiba (JP)

(73) Assignees: Kabushiki Kaisha Kobe Seiko Sho, Tokyo (JP); Teijin Chemicals, Ltd., Tokyo (JP)

(*) Notice: Subject to any disclaimer, the term of this patent is extended or adjusted under 35 U.S.C. 154(b) by 389 days.

(21) Appl. No.: 10/380,967

(22) PCT Filed: May 31, 2002

(86) PCT No.: PCT/JP02/05329

§ 371 (c)(1),
(2), (4) Date: Mar. 21, 2003

(87) PCT Pub. No.: WO02/096616

PCT Pub. Date: Dec. 5, 2002

(65) Prior Publication Data

US 2004/0012122 A1   Jan. 22, 2004

(30) Foreign Application Priority Data

May 31, 2001  (JP)  .............................. 2001-163677
Apr. 30, 2002  (JP)  .............................. 2002-128740

(51) Int. Cl.
*B29C 45/56*  (2006.01)

(52) U.S. Cl. ................. 264/328.7; 425/150; 425/589

(58) Field of Classification Search ................ 264/2.2, 264/328.7; 425/589, 412, 575, 555, 150
See application file for complete search history.

(56) References Cited

U.S. PATENT DOCUMENTS 4,557,889 A * 12/1985 Masuda et al. ............. 264/320
4,828,474 A *  5/1989 Ballantyne ................... 425/150
5,156,782 A * 10/1992 Ballantyne ................. 264/40.5
5,753,164 A *  5/1998 Ritchie et al. ............... 264/102

(Continued)

FOREIGN PATENT DOCUMENTS

JP           1-264823         10/1989

(Continued)

OTHER PUBLICATIONS

Rosato et al., Injection Molding Handbook, 2nd edition, 1995, pp. 207-213.*

*Primary Examiner*—Jill L. Heitbrink
(74) *Attorney, Agent, or Firm*—Oblon, Spivak, McClelland, Maier & Neustadt, P.C.

(57) ABSTRACT

In an injection compression-molding apparatus, a molded article is produced by setting molds 10 and 11 to an intermediate clamped state, and then by setting the molds 10 and 11 to a final clamped state by re-clamping the molds 10 and 11 to each other after injecting melted resin into a cavity defined by the molds 10 and 11. The apparatus includes a clamping mechanism and a parallelism retaining mechanism 20. The clamping mechanism has a mold-driving cylinder 7 for moving the movable mold 10 toward and away from the fixed mold 11, a guide engaging member 8, support panels 4, 5, etc. so as to selectively set the molds 10 and 11 to the intermediate clamped state and the final clamped state. The parallelism retaining mechanism 20 retains parallelism between the molds 10 and 11 in the intermediate clamped state by giving a corrective force to mold attaching surfaces of the clamping mechanism where the respective molds 10 and 11 are mounted.

6 Claims, 8 Drawing Sheets

U.S. PATENT DOCUMENTS

| | | | |
|---|---|---|---|
| 6,290,882 B1 * | 9/2001 | Maus et al. | 264/2.2 |
| 6,368,537 B1 * | 4/2002 | Sato et al. | 264/259 |
| 6,440,351 B1 * | 8/2002 | Saito et al. | 264/328.7 |
| 6,562,264 B1 * | 5/2003 | Taniguchi et al. | 264/40.4 |
| 6,645,417 B1 * | 11/2003 | Grove | 264/328.8 |

FOREIGN PATENT DOCUMENTS

| | | |
|---|---|---|
| JP | 3-221424 | 9/1991 |
| JP | 5-269751 | 10/1993 |
| JP | 2001-47484 | 2/2001 |

* cited by examiner

INJECTION AND COMPRESSION MOLDING WITH PARALLELISM MECHANISM

TECHNICAL FIELD

This invention relates to an injection compression-molding apparatus for producing molded articles by setting molds to an intermediate clamped state and a final clamped state, an injection molding-compression method, injection compression-molded articles producible by such a method, and thermoplastic resinous articles.

BACKGROUND ART

Conventionally, injection molding apparatus comprises a clamping base, a pair of upstanding support panels provided at opposite ends of the clamping base, a guide member which extends horizontally between the support panels, a movable mold which is slidably movable along the extending direction of the guide member, a fixed mold which is fixedly mounted on one of the support panels as opposed to the movable mold, and a mold-driving cylinder which is fixedly mounted on the other one of the support panels to slidingly move the movable mold toward and away from the fixed mold.

Generally, in performing injection molding with the above-constructed apparatus, the movable mold is pressingly moved toward the fixed mold along the extending direction of the guide member to be clamped with the fixed mold with a sufficient clamping force, and then, melted resin is injected in the cavity defined by the movable mold and the fixed mold. Then, the injected resin is cooled and solidified to produce a molded article.

In the above conventional injection molding method, it is highly likely that a large residual stress remains in a molded article. With such a large residual stress remaining in a molded article, it is highly likely that strain or refractive index in the molded article exceeds a permissible range if such a molded article is to be used for special purposes such as parts for precision instruments and optical instruments.

In producing molded articles for special use, an injection compression-molding method has been proposed in an attempt to produce molded articles free of residual stress (see Japanese Unexamined Patent Publication No. 2000-6231, Japanese Unexamined Patent Publication No. 4-228298). According to this method, before injection molding, a pair of molds are set to such an intermediate clamped state where the molds are spaced apart from each other with a small clearance, or the molds are clamped to each other with such a moderate clamping force as to allow the molds to be spaced apart from each other under an injection pressure. Then, the molds are clamped to each other again to a final clamped state upon injection of melted resin into the cavity defined by the molds.

However, the above injection molding apparatus has been designed based on the idea of using ordinary injection molding method of injecting melted resin in a state that the molds are set to a final clamped state where the molds are clamped to each other with a sufficient clamping force. Accordingly, the technology disclosed in the above publications does not consider necessity of keeping the parallelism of the movable mold and the fixed mold in a condition that melted resin be injected in an incomplete clamped state.

Consequently, in the case where molded articles are produced by the above injection compression-molding method, there rises a problem, as shown in FIG. 9, that parallelism of parting surfaces of molds 91, 92 is not maintained due to, for example, flexure of a guide member 93, with the result that quality of molded articles may be deteriorated.

Further, if the molds 91, 92 are set to a final clamped state by re-clamping in a state that sufficient parallelism between the molds 91, 92 is not secured, it is highly likely that the molds 91, 92 may be damaged or broken due to abrasion between the molds 91, 92.

The above-mentioned drawbacks become remarkable in the case where mechanical wear of the injection molding apparatus such as abrasion of the guide member 93 and tilting of support panels 94, 95 becomes serious by repeated operations of the injection molding apparatus.

DISCLOSURE OF THE INVENTION

In view of the above, an object of the invention is to provide an injection compression-molding apparatus and an injection compression-molding method which enable to produce molded articles of high-quality for a long term, and an injection compression-molded article producible by such a method, and a thermoplastic resinous article.

BEST MODE FOR CARRYING OUT THE INVENTION

An embodiment of the invention is described with reference to FIGS. 1 through 8.

An injection compression-molding apparatus according to an embodiment of the invention is used in producing molded articles of parts for optical instruments and precision instruments such as transparent lenses, compact discs (CDs) and floppy disks (FDs).

The apparatus can be used as a molding apparatus for molding transparent members for automotive vehicles, outside panels for automotive vehicles, inner coverings for automotive vehicles, and plate-like molded articles having optical function.

The transparent members for automotive vehicles include glazing members (such as front-door windows, rear-door windows, quarter windows, rear windows, and backdoor windows, as well as sun roofs and roof panels), and headlamp lenses, solar cell covers, windscreens, and information-display-type instrumental panels.

The outside panels for automotive vehicles include outside panels for automotive vehicles, cauls, and hardtops. The inner coverings for automotive vehicles include instrumental panels. The plate-like molded articles having optical function include Fresnel lenses, light diffusive sheets, lenticular lens seeds (sic), prism sheets, and lens arrays.

Figure 1:
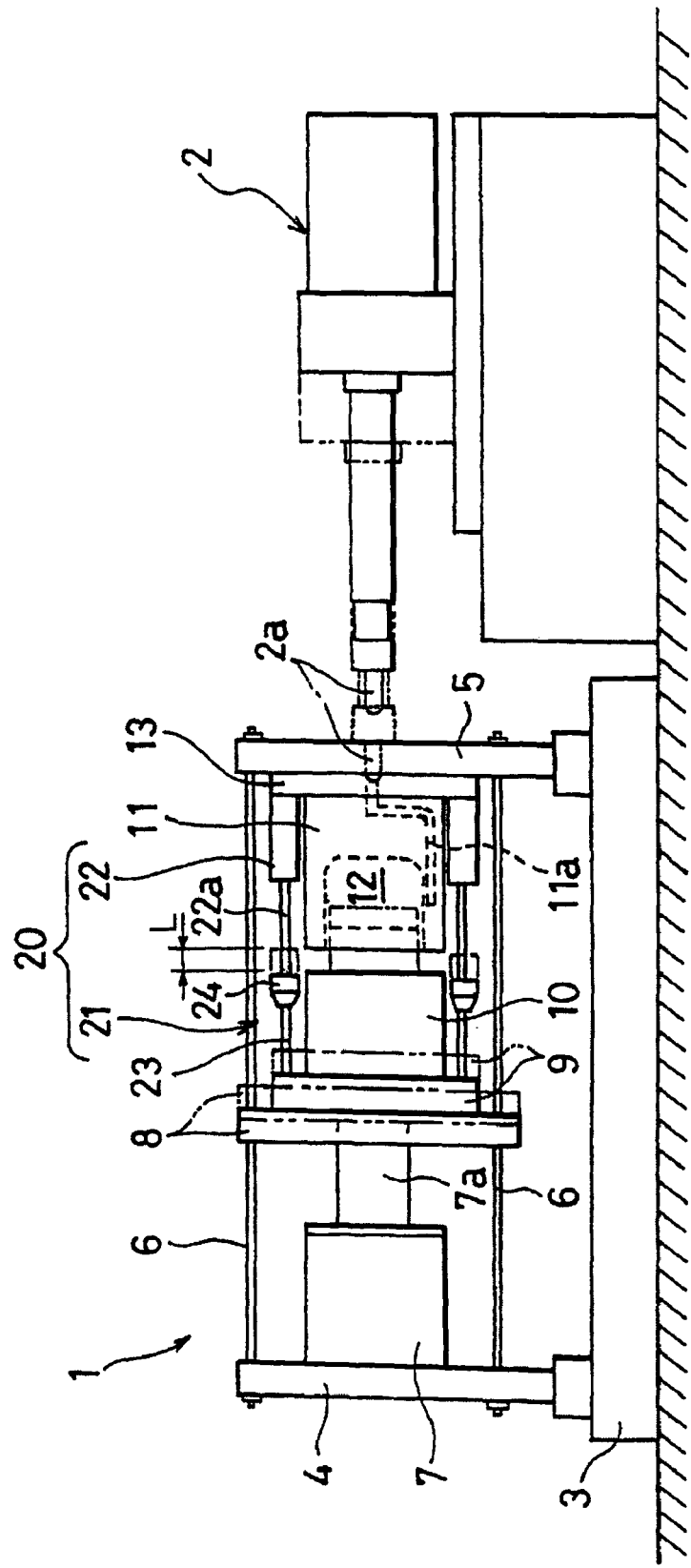
FIG. 1 is a schematic diagram showing an injection compression-molding apparatus in accordance with an embodiment of the invention.

The injection compression-molding apparatus includes, as shown in FIG. 1, a molding unit 1 for cooling and solidifying melted resin into molded articles, and an injection unit 2 for injecting melted resin such as polycarbonate (PC) resin and polymethyl methacrylate (PMMA) resin into the molding unit 1.

The molding unit 1 has a clamping base 3. Support panels 4, 5 are provided at transversely opposite ends of the clamping base 3 in FIG. 1.

A rod-like guide member 6 extends between the support panels 4, 5 at each corner portion of the support panel 4 (5).

A mold-driving cylinder 7 is provided on the left-side support panel 4 in FIG. 1 to move a cylinder rod 7a toward and away from the support panel 5 so as to drivingly open and close molds. A guide engaging member 8 is attached to a distal end portion of the cylinder rod 7a.

The guide members 6 are slidably passed through corner portions of the guide engaging member 8, respectively. Expansion and contraction of the cylinder rod 7a of the mold-driving cylinder 7 toward and away from the support panel 5 is regulated by the guide engaging member 8 which is moved back and forth along the extending direction of the guide members 6.

A planar common plate 9 is detachably attached to the guide engaging member 8 on the side of a movable mold.

A planar common plate 13 is detachably attached to the support panel 5 on the side of a fixed mold as opposed to the movable-side common plate 9.

A movable mold 10 and a fixed mold 11 are mounted at a central part of opposing surfaces (mold attaching surfaces) of the common plates 9, and 13, respectively. A cavity 12 having a shape in correspondence with an outer configuration of a molded article is defined by the molds 10, 11 by moving the movable mold 10 toward the fixed mold 11 for clamping.

A gate 11a is formed inside the fixed mold 11 to flow melted resin therein.

The gate 11a extends along an outer wall portion of the fixed mold 11 with one end thereof being communicated with the backside surface of the fixed mold 11 (on the side of the injection unit 2) and with the opposite end thereof being communicated with a side surface of the cavity 12.

Figure 2:
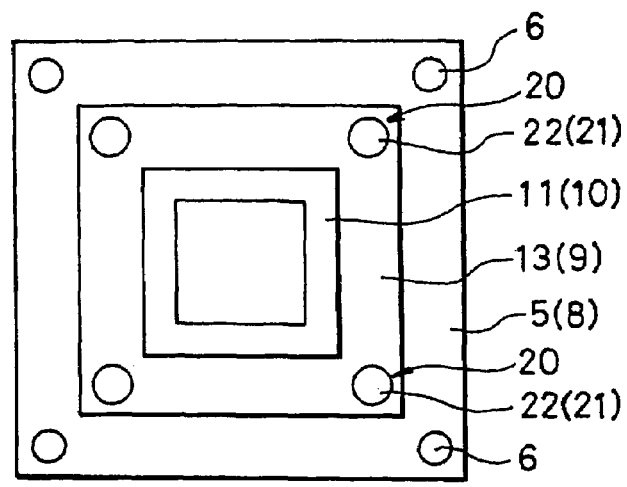
FIG. 2 is an explanatory diagram showing a parallelism retaining mechanism in the apparatus.

As shown in FIG. 2, a plurality of parallelism retaining mechanisms 20 are provided at surrounding portions of the molds 10, 11 for regulating the parallelism between the molds 10, 11.

The parallelism retaining mechanism 20 each includes a contact unit 21 attached to the mold attaching surface of the movable-side common plate 9, and a positioning cylinder 22 attached to the mold attaching surface of the fixed-side common plate 13.

In this embodiment, the positioning cylinder 22 is a hydraulic cylinder for drivingly expanding and retracting the cylinder rod 22a toward and away from the contact unit 21.

Figure 3A:
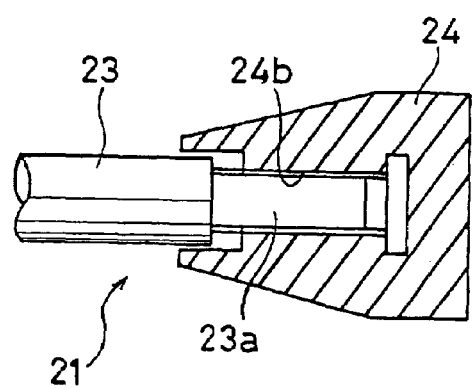
FIG. 3A is an elevational front view of a head member and a rod member in the parallelism retaining mechanism.

The contact unit 21 includes, as shown in FIG. 3A, a rod member 23 provided in parallel with the moving direction of the movable mold 10, and a head member 24 provided at a distal end portion of the rod member 23 to be movable toward and away from the distal end portion of the rod member 23.

The rod member 23 is operatively connected to the head member 24, as shown in FIG. 3A by a micrometer mechanism in which an externally threaded portion 23a formed at the distal end portion of the rod member 23 is meshed with an internally threaded portion 24b formed in the head member 24. The externally threaded portion 23a (internally threaded portion 24b) is threaded at a certain pitch, e.g., 2 mm so as to move the head member 24 toward and away from the distal end portion of the rod member 23 stepwise at a certain pitch, e.g. 2 mm in response to one turn of the head member 24.

Figure 3B:
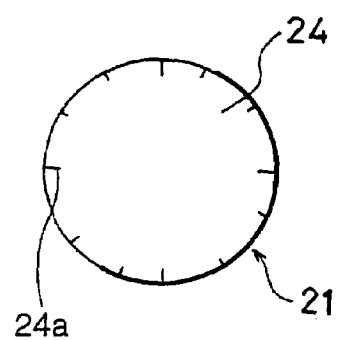
FIG. 3B is a side view of the head member.

As shown in FIG. 3B, a scale 24a is defined in a periphery of the head member 24 so as to allow an operator to recognize an angular displacement (advance/retract amount) of the head member 24.

The thus-constructed parallelism retaining mechanisms 20 retain parallelism between the movable-side common plate 9 (movable mold 10) and the fixed-side common plate 13 (fixed mold 11) by positioning the head members 24 relative to the respective corresponding rod members 23 by rotation of the head members 24, and then by rendering the cylinder rods 22a of the positioning cylinders 22 in pressing contact with the respective corresponding head members 24 with a maximal expanding amount.

Figure 5:
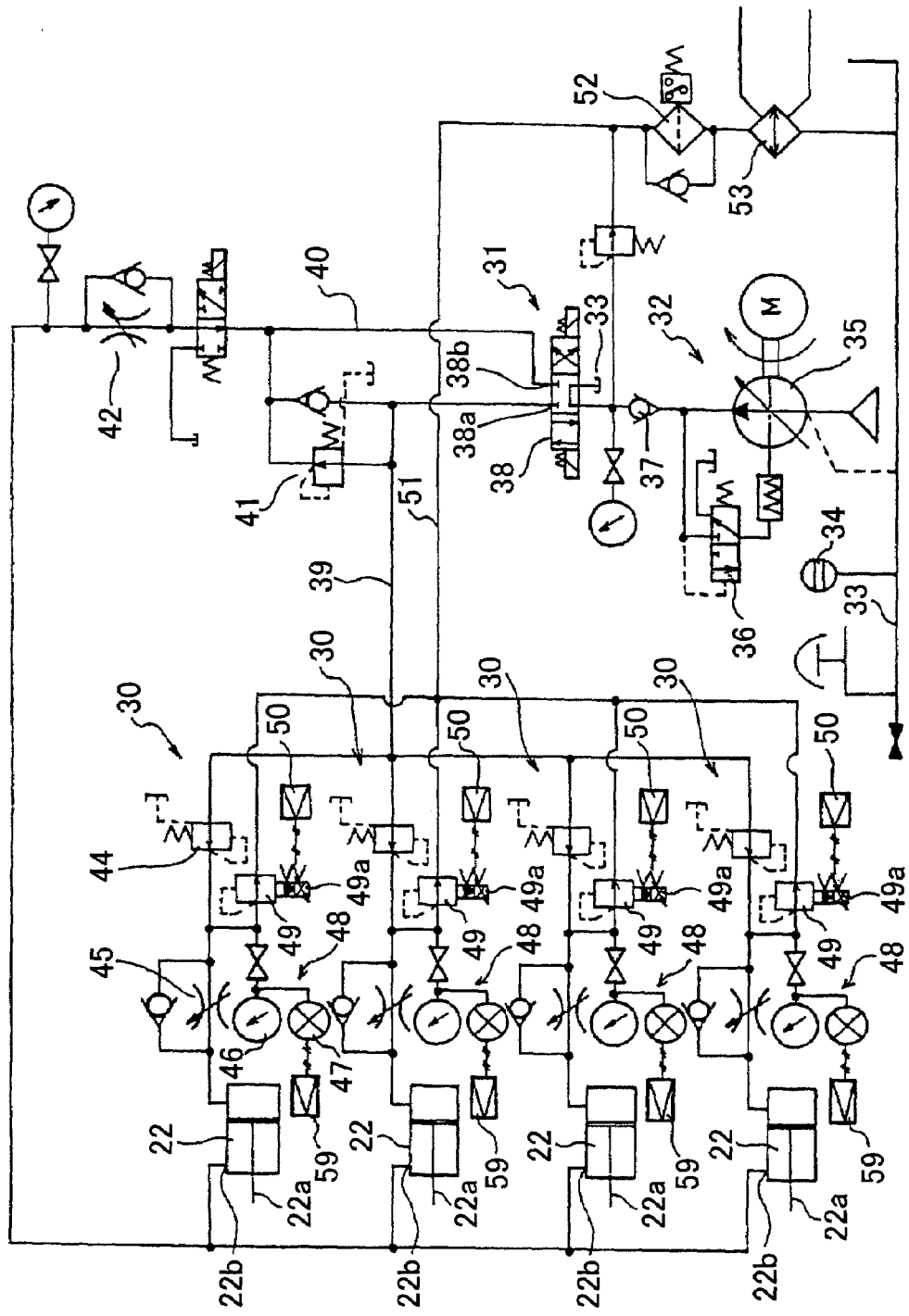
FIG. 5 is a circuit diagram of a hydraulic system used in the parallelism retaining mechanism.

A hydraulic circuit for controlling operations of the respective positioning cylinders 22 is described referring to FIG. 5.

The hydraulic circuit includes hydraulic pressure setting sections 30, an advance/retract controlling section 31, and a hydraulic fluid supply section 32. The hydraulic pressure setting section 30 each is operative to controllably feed and discharge hydraulic fluid so as to control the positioning cylinder 22 of the corresponding parallelism retaining mechanism 20 for expansion/contraction of the corresponding cylinder rod 22a while supporting the positioning cylinder 22 at a certain retaining pressure. The advance/retract controlling section 31 operatively changes a direction of feeding hydraulic fluid in the position cylinder 22 so as to control the expansion/contraction of the corresponding cylinder rod 22a. The hydraulic fluid supply section 32 supplies hydraulic fluid to the positioning cylinders 22.

The hydraulic fluid supply section 32 includes an oil pan 33 for storing hydraulic fluid therein, an oil level gauge 34 for detecting the level of the hydraulic fluid stored in the oil pan 33, a variable pump 35 for feeding the hydraulic fluid stored in the oil pan 33 to the positioning cylinders 22, and a pump control valve 36 for controlling the tilting angle (fluid eject amount) of a swash plate of the pump in accordance with a fluid ejecting pressure from the pump 35.

A main switching valve 38 constituting the advance/retract controlling section 31 is connected to the variable pump 35 on the fluid feeding side by way of a monitoring valve 37.

The main switching valve 38 includes an electromagnetic pilot switching valve of 4-port-3-position type. One output port 38a of the main switching valve 38 is connected to each hydraulic pressure setting section 30 by way of a pipe 39 for cylinder expansion.

The other output port 38b of the main switching valve 38 is connected to a fluid discharging port 22b of each positioning cylinder 22 by way of a pipe 40 for cylinder retraction.

The main switching valve 38 has a function of setting each cylinder rod 22a to a fixed state by suspending feeding of hydraulic fluid to the corresponding positioning cylinder 22 upon setting the valve element to a neutral position, a function of controlling the positioning cylinder 22 to expand the cylinder rod 22a toward the contact unit 21 by communicating the hydraulic fluid supply section 32 with the output port 38a and by feeding hydraulic fluid to the corresponding hydraulic pressure setting section 30, and a function of controlling each positioning cylinder 22 to contract the corresponding cylinder rod 22a away from the contact unit 21 by communicating the hydraulic fluid supply section 32 with the output port 38b and by discharging hydraulic fluid to the corresponding discharging port 22b.

A first variable throttle valve 42 is provided at an appropriate position on the pipe 40 for cylinder retraction which is connected to the advance/retract controlling section 31 to restrict the contracting rate of the corresponding cylinder rod 22a controlled by each positioning cylinder 22.

The hydraulic pressure setting sections 30 connected to the pipe 39 for cylinder expansion each includes a pressure-reducing valve 44 which is set at a certain pressure, a second variable throttle valve 45 which is serially connected to the pressure-reducing valve 44 and is adapted to restrict the expanding rate of the corresponding cylinder rod 22a, a pressure gauge 46 for detecting a pressure between the pressure-reducing valve 44 and the second variable throttle valve 45, a pressure detector 48 comprised of a pressure indicator 47 and a load cell amplifier, a proportional electromagnetic pressure control valve 49 which is connected between the pressure-reducing valve 44 and the second variable throttle valve 45, and a pressure changing amplifier 50 for changing the pressure set with respect to the proportional electromagnetic pressure control valve 49.

The pressure set with respect to the proportional electromagnetic pressure control valve 49 is set higher than the pressure set with respect to the pressure-reducing valve 44 by 0.7 Pa or more.

The proportional electromagnetic pressure control valve 49 is connected to a pipe 51 for feeding back the hydraulic fluid.

The pipe 51 for fluid feedback is connected to the oil pan 33 by way of a filter 52 for removing contamination foreign matters in the hydraulic fluid and a heat exchanger 53 for cooling the hydraulic fluid.

The hydraulic pressure setting sections 30 each provided with the proportional electromagnetic pressure control valve 49 has a function of expanding the corresponding cylinder rod 22a at a pressure set for the corresponding pressure-reducing valve 44 and at an expanding rate set for the corresponding second variable throttle valve 45 when hydraulic fluid is supplied from the hydraulic fluid supply section 32, and a function of contracting the cylinder rod 22a by discharging the hydraulic fluid from the proportional electromagnetic pressure control valve 49 through the pipe 51 in the case where a pressing force to pressingly contracting the cylinder rod 22a away from the contact unit 21 exceeds a pressure set with respect to the proportional electromagnetic pressure control valve 49 (namely, retaining pressure for retaining the cylinder rod 22a).

Figure 4:
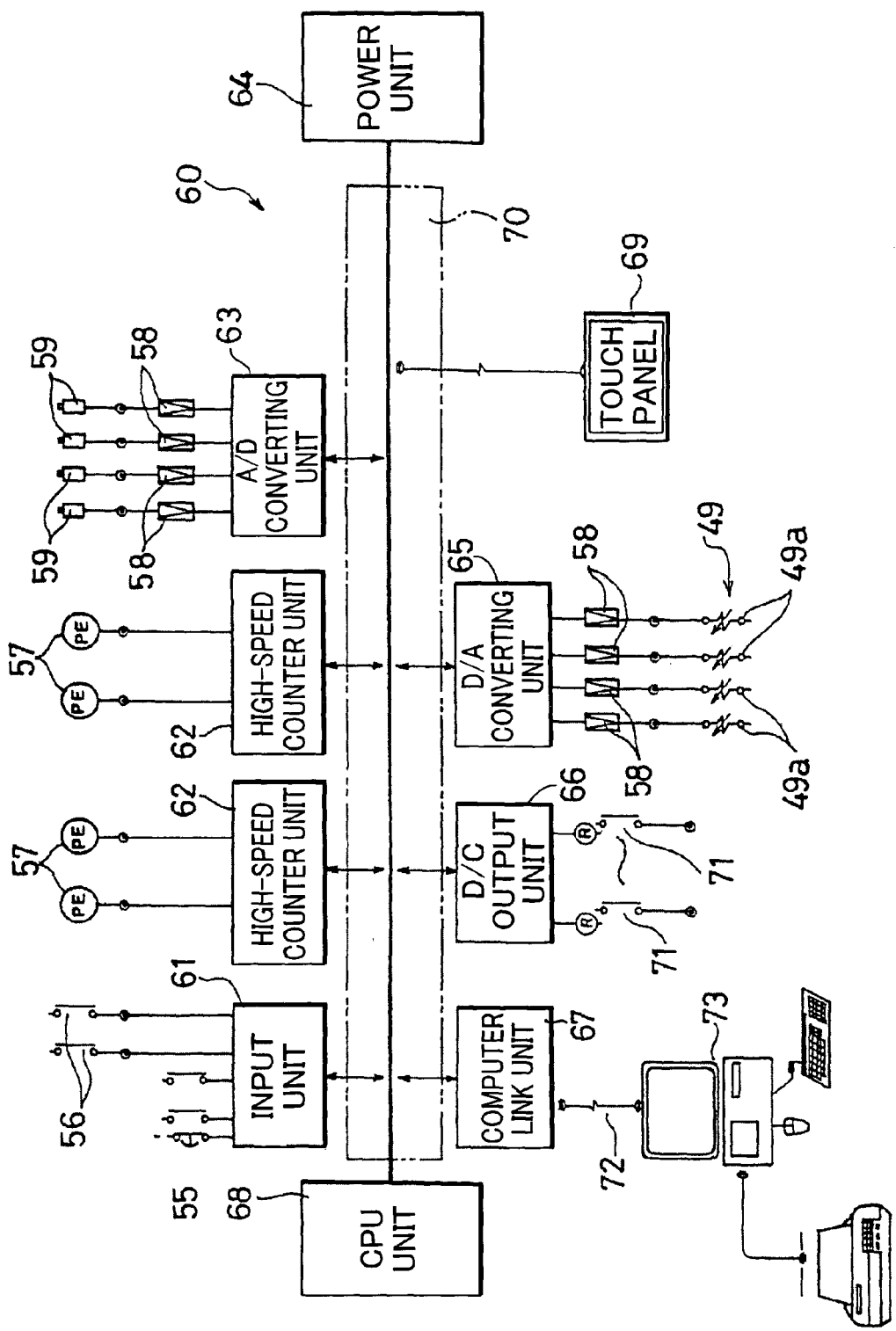
FIG. 4 is a block diagram of a control system.

The thus-constructed hydraulic circuit is controlled by a control system 60, as shown in FIG. 4.

The control system 60 incorporates a substrate 70 on which wiring is established in such a manner that various signals are communicable.

On the substrate 70, arranged are an input unit 61 for detecting a status as to whether an electric current is supplied to set an input signal, high-speed counter units 62 each adapted for counting the number of pulse signal to set a counter value, an A/D converting unit 63 for receiving an analog signal including a voltage signal and a current signal and converting analog signals into digital signals, a power unit 64 for feeding power to the control system 60, a D/A converting unit 65 for converting digital signals into analog signals for output, a D/C output unit 66 for outputting a direct current, a line-connected computer link unit 67 for rendering data in the control system 60 to be communicable by a protocol corresponding to a communication procedure such as RS232C, and a CPU unit 68 for controlling and monitoring operations of the units 61 through 67. A touch panel 69 is connected to the substrate 70 to enable an operator to set operations of the respective units through the CPU unit 68.

An emergency switch 55 and a plurality of limit switches 56 are connected to the input unit 61.

The emergency switch 55 is adapted to allow an operator to suspend operation of the injection compression-molding apparatus under emergency, for example, upon detection of anomaly of the apparatus.

The limit switches 56 are provided in correspondence with the mold-driving cylinder 7, the positioning cylinders 22, etc. (see FIG. 1) so as to set the expanding amount controlled by the cylinders 7, 22, for example.

Pulse encoders 57 are connected to the high-speed counter units 62.

The pulse encoder 57 is provided in each parallelism retaining mechanism 20 shown in FIG. 1 to output a pulse signal in accordance with rotation of the corresponding head member 24.

Load cells 59 are connected to the A/D converting unit 63 by a corresponding one of amplifiers 58.

The D/A converting unit 65 is connected to a coil portion 49a of each proportional electromagnetic pressure control valve 49 by the corresponding amplifier 58.

As shown in FIG. 5, each load cell 59 is provided in the corresponding hydraulic pressure setting section 30 to detect a hydraulic pressure to be given to the corresponding proportional electromagnetic pressure control valve 49.

A plurality of relays 71 are connected to the D/C output unit 66. Each relay 71 controllably opens and closes the corresponding pressure-reducing valve 44 and the like in the hydraulic circuit.

The computer link unit 67 is connected to an information processing unit 73 such as a personal computer by a communications line 72. The information processing unit 73 administers operating status and production status of the injection compression-molding apparatus by communicating data with the control system 60.

Operations of the injection compression-molding apparatus having the above construction are described next.

[Assembling]

In the case where the injection compression-molding apparatus is built based on a conventional injection molding apparatus of horizontal-clamping type in which molds are clamped to each other horizontally, the movable-side common plate 9 and the fixed-side common plate 13 shown in FIGS. 1 and 2 are prepared in the following manner.

Specifically, the movable mold 10 and the contact units 21 are mounted on the mold attaching surface of the movable-side common plate 9, whereas the fixed mold 11 and the positioning cylinders 22 are mounted on the mold attaching surface of the fixed-side common plate 13.

Then, as shown in FIG. 1, the movable-side common plate 9 and the fixed-side common plate 13 mounted with the above elements thereon are conveyed to the conventional injection molding apparatus, and are attached to the guide engaging member 8 and the support panel 5 as opposed thereto, respectively.

In this way, the conventional injection molding apparatus is assembled into the injection compression-molding apparatus in which four parallelism retaining mechanisms 20 are assembled at surrounding portions of the molds 10, 11.

As mentioned above, since the assembling is completed by merely mounting the common plates 9, 13 to the conventional injection molding apparatus, assembling into the apparatus is completed in a short period unlike the case where the molds 10, 11 and the parallelism retaining mechanisms 20 are directly attached to the conventional injection molding apparatus.

Further, the operation of transforming the injection apparatus from the injection compression-molding apparatus into the conventional apparatus is completed in a short period by merely detaching the common plates 9, 13.

It should be appreciated that the common plate 9 (13) may be of a block type (not shown) in which a plate is divided into plural blocks in correspondence with elements to be mounted, in place of an integral type as shown in FIG. 1 where plural elements are mounted on a single common plate.

[Parallelism Aligning Operation]

Upon completion of the assembling into the injection compression-molding apparatus as mentioned above, the head members 24 are rotated so as to move the head members 24 toward the movable-side common plate 9.

Thereafter, the movable mold 10 is advanced toward the fixed mold 11 by activation of the mold-driving cylinder 7. When the movable mold 10 is advanced to an intermediate clamped position corresponding to a certain compression amount required for producing a molded article, the driving operation of the mold-driving cylinder 7 is suspended. Thereby, the movable mold 10 is set to an intermediate clamped state where the movable mold 10 is spaced away from the fixed mold 11 with a certain clearance L.

Then, the positioning cylinders 22 are driven to expand the cylinder rods 22a toward the respective corresponding head members 24. The expansion of the cylinder rods 22a to be rendered in pressing contact with the head members 24 is suspended when the expanding amount reaches a maximal level. Thereafter, the head members 24 are moved toward the fixed-side common plate 13 (toward the positioning cylinders 22) by rotating the head members 24.

A position where the distal end portions of the head members 24 are abutted against the respective corresponding cylinder rods 22a is set at "0". The distal end portions of all the head members 24 are set away from the movable-side common plate 9 with a certain distance by keeping rotating the head members 24 from "0" position in the same direction toward the common plate 13.

An operator is enabled to confirm the above setting operation by viewing the scale defined in the periphery of each head member 24.

As a result of the above setting operation, the cylinder rods 22a of the positioning cylinders 22 expanded at the maximal advancing amount are abutted against the respective corresponding head members 24 all of which are set at the certain distance from the movable-side common plate 9.

Thereby, all the parallelism retaining mechanisms 20 each equipped with the positioning cylinder 22 and the head member 24 are allowed to have the length substantially identical to each other between the common plates 9 and 13.

Thus, by the parallelism retaining mechanisms 20 provided at respective four corners of the common plates 9, 13, the distances between the mold attaching surfaces of the common plates 9 and 13 at the four corners are set at a constant value. Thereby, the molds 10, 11 in an intermediate clamped state are horizontally aligned to each other with a high precision.

Thereafter, by retracting the movable mold 10 away from the fixed mold 11, the parallelism aligning operation is completed.

[Molding Operation]

After the parallelism aligning operation is completed as described above, the apparatus enters molding operation.

First, as shown in FIG. 5, the main switching valve 38 of the advance/retract controlling section 31 is changed from a neutral position to an operable position to feed hydraulic fluid to each hydraulic pressure setting section 30.

When hydraulic fluid is supplied to the hydraulic pressure setting sections 30, the hydraulic fluid flows into each positioning cylinder 22 while regulating the flow rate of the fluid by the corresponding second variable throttle valve 45. Thereby, the cylinder rods 22a are gradually expanded toward the respective corresponding head members 24 from the respective corresponding positioning cylinders 22, and the expansion is suspended when the cylinder rods 22a are expanded with a maximal expanding amount.

Next, the movable-side common plate 9 is moved toward the fixed-sided common plate 13 by the mold-driving cylinder 7, and the movable mold 10 and the contact units 21 mounted on the movable-side common plate 9 are advanced toward the fixed-side common plate 13.

The advancement is continued until the movable mold 10 is set to an intermediate clamped state corresponding to a certain compression amount required for producing a molded article.

When the contact units 21 are advanced along with the movable mold 10, the distal end portions of the head members 24 are abutted against the respective cylinder rods 22a of the positioning cylinders 22.

Let it be assumed that the movable mold 10 (movable-side common plate 9) is tilted relative to the fixed mold 11 (fixed-side common plate 13) during the advancement. At this time, the head members 24 of the contact units 21 located in the portion in which the relative distance between the common plates 9 and 13 is smallest of all abuts first against the respective corresponding cylinder rods 22a of the positioning cylinders 22.

When the common plate 9 is kept on advancing toward the common plate 13 in the above tilted state, the tilting of the common plate 9 relative to the common plate 13 is corrected by using the parallelism retaining mechanisms 20 as a fulcrum in which the contact units 21 are abutted against the respective corresponding positioning cylinders 22 and which has a specific length by the abutment. Then, the parallelism retaining mechanisms 20 having the length identical to one another between the common plates 9 and 13 correctively sets the distance between the common plates 9 and 13 at a constant value by cooperative operation of these four parallelism retaining mechanisms 20. Thus, the molds 10, 11 in an intermediate clamped state are horizontally aligned to each other with high precision.

Next, melted resin is injected from the injection unit 2 in the following manner.

Figure 6:
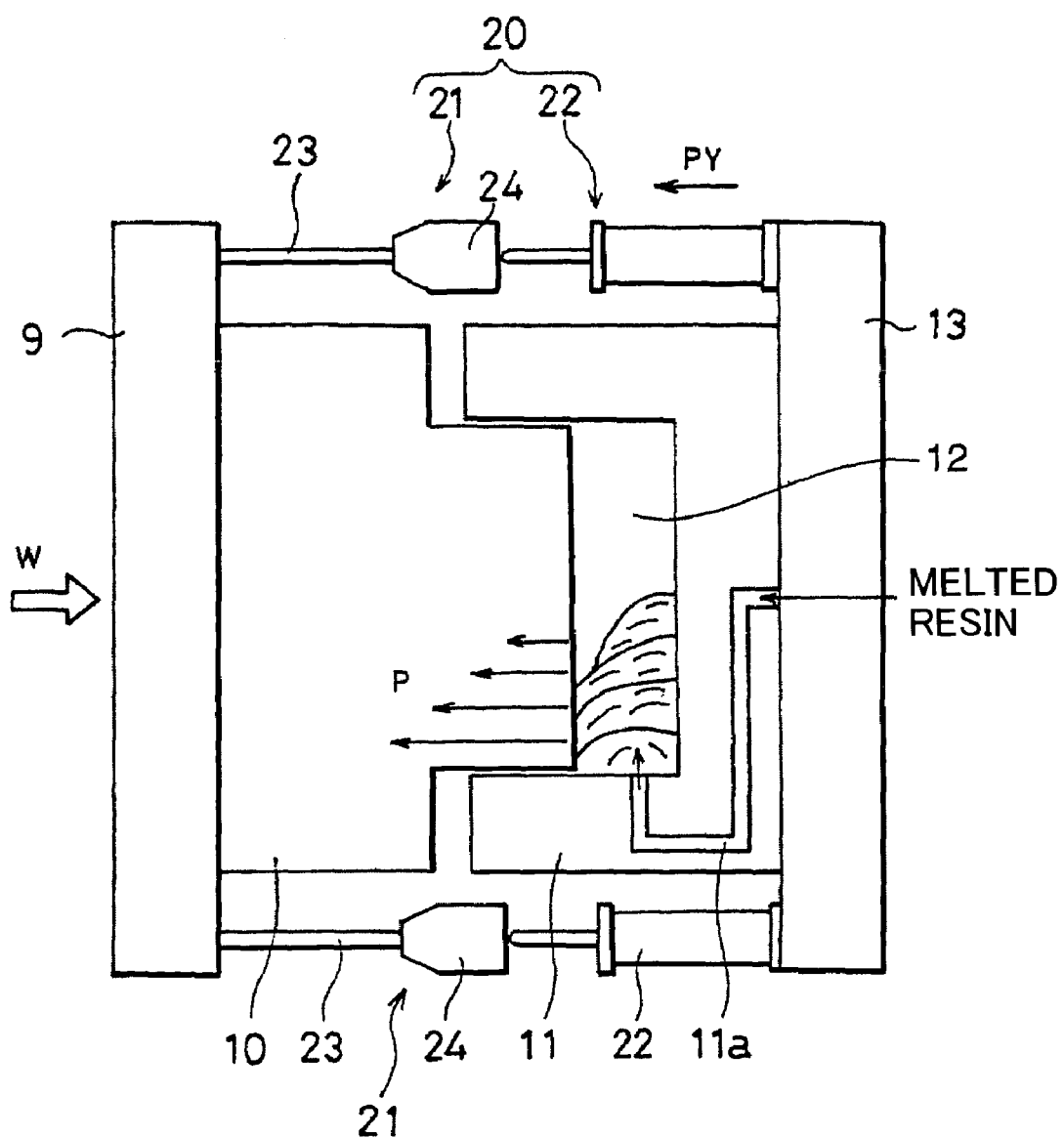
FIG. 6 is an explanatory diagram showing a state that melted resin is injected in a cavity defined by molds.

Melted resin is injected into the cavity 12 through one side portion of the cavity 12 along the gate 11a of the fixed mold 11, as shown in FIG. 6. The resin fills the cavity 12 while being injected from the one side portion of the cavity 12 toward the opposite side portion thereof.

When the entirety of the cavity 12 is filled with the melted resin, a pressure P (repulsion force) is exerted from the filled resin between the molds 10 and 11, for example, to the mold 10 in the direction as shown by the arrows in FIG. 6. If the resin pressure P acting on the mold 10 is varied vertically (namely, the resin pressure P acting on the cavity surface of the movable mold 10 varies or decreases in a direction of injecting the resin from the one side portion of the cavity 12 toward the opposite side portion thereof), load variation is generated on the cavity surface of the mold 10.

The control system shown in FIG. 4 adjusts the retaining pressure with respect to each parallelism retaining mechanism 20 (pressure set with respect to each proportional electromagnetic pressure control valve 49) in such a manner that the parallelism between the molds 10 and 11 is not lost due to generation of load variation when the molds 10 and 11 are clamped to each other again from an intermediate clamped state.

More specifically, as shown in FIG. 5, a relatively large pressure is set with respect to the proportional electromagnetic pressure control valve 49 of the hydraulic pressure setting section 30 located at a site where a relatively small load of the resin pressure P is acted, whereas a relative small pressure is set with respect to the proportional electromagnetic pressure control valve 49 of the hydraulic pressure setting section 30 located at a site where a relative large load of the resin pressure P is acted.

In this way, the difference in the combined force of a set pressure with respect to the proportional electromagnetic pressure control valves 49 and a varied load due to a difference in resin pressure at the respective sites of the molds 10 and 11 is adjusted so as to minimize.

Further, in the adjustment, as shown in FIG. 6, the sum (=PY+P) is set at a value smaller than a re-clamping force W where PY represents pressures exerted to all the parallelism retaining mechanisms 20 to retain a parallelism, and P represents pressures acted on the molds 10, 11 from the melted resin so as to enable re-clamping.

Preferably, the resin pressure P may be an estimated value which has been stored in the control system 60 shown in FIG. 4 in advance, or may be a measured value which has been obtained by measuring with an unillustrated pressure sensor.

The setting of the retaining pressure PY with respect to the parallelism retaining mechanisms 20 is advantageous as follows. Even if a large load variation is generated due to a difference in resin pressure P (repulsion force) with respect to the cavity surfaces of the molds 10 and 11, the retaining force PY with respect to all the parallelism retaining mechanisms 20 minimizes an adverse effect of the load variation. Thereby, parallelism by the parallelism retaining mechanisms 20 is ensured with high precision during re-clamping as well as in an intermediate clamped state.

The above arrangement prevents drawbacks such as quality deterioration of molded articles due to poor parallelism between the molds 10 and 11, abrasion between the molds 10 and 11, and damage/breakage of the molds 10 and 11.

Further, high parallelism is ensured by the parallelism retaining mechanisms 20 in an intermediate clamped state and in a re-clamped state even if mechanical wear of the injection compression-molding apparatus such as wear-out of the guide member 6 and tilting of the support panels 4, 5 is serious due to repeated operations by the apparatus.

As mentioned above, according to the injection compression-molding apparatus in accordance with the above embodiment, melted resin can be substantially uniformly filled into the cavity 12 by retaining a parallelism by the parallelism retaining mechanisms 20 (parallelism retainer) for retaining a parallelism between the molds 10 and 11 when the molds 10 and 11 are set in an intermediate clamped state.

With the above arrangement, melted resin in the cavity 12 is uniformly compressed when the molds 10 and 11 are shifted from an intermediate clamped state to a final clamped state. Thereby, produced are molded articles of high-quality in which residual stress is sufficiently minimized after cooling the melted resin.

Further, in re-clamping the molds 10 and 11 from the intermediate clamped state, the above arrangement secures a parallelism between the molds 10 and 11, thereby securely eliminating drawbacks such as abrasion between the molds 10 and 11, and damage/breakage of the molds 10 and 11.

Furthermore, even if the elements (parts) in the apparatus may be worn out, high parallelism between the molds 10 and 11 is maintained in an intermediate clamped state by the parallelism retaining mechanisms 20. Accordingly, molded articles of high-quality are producible for a long term.

In the above embodiment, the parallelism retaining mechanisms 20 for giving a corrective force to the mold attaching surfaces of the clamping mechanism in a clamping direction constitute parallelism retainer. Alternatively, the parallelism retainer may have a construction such that a corrective force may be acted on side surfaces of the molds 10 and 11 in a direction orthogonal to the clamping direction by a jack mechanism or its equivalent to retain a high parallelism between the molds 10 and 11 when the molds 10 and 11 are set to an intermediate clamped state.

In the above embodiment, the movable mold 10 is moved toward and away from the fixed mold 11. Alternatively, at least one of molds may be movable toward and away from the other one of the molds.

In the above embodiment, the molds 10 and 11 are clamped again to set the molds 10 and 11 to a final clamped state after injecting melted resin into the cavity 12. Alternatively, re-clamping may be carried out along with resin injection until the molds 10 and 11 are set to a final clamped state.

The injection compression-molding apparatus in accordance with the above embodiment may be of any type employing a vertical-clamping arrangement where the molds 10 and 11 are clamped to each other in a vertical direction or a parallelism-clamping arrangement where the molds 10 and 11 are clamped to each other in a horizontal direction. A horizontal-clamping arrangement is more preferable because it securely retains a parallelism between molds with less force and improves molding efficiency.

Further, the injection compression-molding apparatus in accordance with the above embodiment incorporates, in addition to the above arrangement, the hydraulic pressure setting sections 30 each adapted for controllably feeding and discharging hydraulic fluid so as to control the positioning cylinder 22 of the parallelism retaining mechanism 20 to expand and retract the cylinder rod 22a and to retain the positioning cylinder 22 at a desired retaining pressure, and the control system 60 which is operative to individually set the retaining pressure in each hydraulic pressure setting section 30 in such a manner as to minimize an influence of load variation to a parallelism in re-clamping in the case where such a load variation is generated due to injected melted resin into the cavity 12 when the molds 10 and 11 are set at an intermediate clamped position. In this arrangement, the retaining pressure with respect to the parallelism retaining mechanisms 20 is set considering a load variation resulting from injection of melted resin. Accordingly, parallelism between the molds 10 and 11 is securely maintained at a high precision even during re-clamping.

With the above arrangement, molded articles of high-quality are producible, and drawbacks such as abrasion of molds 10 and 11 are effectively prevented.

In the embodiment, the retaining pressures at the hydraulic fluid setting sections 30 are individually set while fixing the fluid discharge rates of the hydraulic pressure setting sections 30. Alternatively, the fluid discharge rates of the hydraulic pressure setting sections 30 may be individually set while fixing the retaining pressures at the hydraulic fluid setting sections 30. Further alternatively, both of the retaining pressures and the fluid discharging rates may be individually set.

The parallelism retaining mechanisms 20 in the above embodiment each include the positioning cylinder 22 which is provided at one of the plural locations between the mold attaching surfaces of the clamping mechanism, and the contact unit 21. Thereby, the parallelism retaining mechanisms 20 are established with a simplified construction with less number of parts comprised of the contact units 21 and the cylinder rods 22a.

In the above embodiment, the contact units 21 and the positioning cylinders 22 are attached to the mold attaching surfaces of the movable-side common plate 9 and the fixed-side common plate 13, respectively. Alternatively, the parallelism retaining mechanisms 20 each may be constructed in such a manner that the contact unit 21 and the positioning cylinder 22 are attached to each other serially as a one-piece unit to be mounted on one of the mold attaching surfaces of the common plates 9 and 13.

For instance, the parallelism retaining mechanism 20 may be constructed in such a manner that a micrometer position adjusting mechanism substantially equivalent to the contact unit 21 may be attached on the mold attaching surface of the fixed-side common plate 13, and the micrometer position adjusting mechanism may be linked to the positioning cylinder 22.

In this embodiment, the parallelism retaining mechanism 20 is constructed in such a manner that the micrometer mechanism formed at the distal end portion of the contact unit 21 makes it possible to advance and retract the contact unit 21 toward and away from the corresponding positioning cylinder 22. With this arrangement, the distal end portion of each contact unit 21 is positioned relative to the corresponding cylinder rod 22a at a desired position accurately by the micrometer mechanism having a simplified construction and with less number of parts.

In the embodiment, the advancement/retraction of the distal end portion of the contact unit 21 is carried out by a micrometer mechanism. Alternatively, the advancement/retraction of the distal end portion of the contact unit 21 may be carried out by a mechanism in which a jack, a ball screw, and a servo motor are combined and which is capable of micrometer positioning.

Since the molds 10, 11 and the parallelism retaining mechanisms 20 are detachably mounted on the movable-side common plate 9 and the fixed-side common plate 13, the injection compression-molding apparatus is built by merely mounting the common plates 9 and 13 on a conventional injection molding apparatus.

According to another aspect of the invention, provided is an injection compression-molding method with use of the injection compression-molding apparatus mentioned above.

The requirements on molding by the molding method are optimally settable depending on what molded article is to be produced. However, preferred molding requirements are described as shown below.

According to the injection compression-molding method, the volume ratio of the cavity 12 in an intermediate clamped state relative to the volume of a target molded article is 1.2 or more, preferably, 1.3 or more, furthermore preferably 1.4 or more, and most preferably 1.5 or more. The effect of the invention increases as the ratio increases. However, exceedingly high ratio may lower the molding efficiency and cause defect in molded articles such as jetting. In view of this, it is preferable to set the upper limit of the ratio at 3 or less, and more preferably at 2 or less.

In the injection compression-molding method, it is preferable to set a state where the parting surfaces of the molds 10 and 11 do not contact with each other as a final clamped state.

It is possible to perform molding in a contact state of the molds 10 and 11 according to the injection compression-molding method. However, the non-contact state where the parting surfaces of the molds 10 and 11 do not contact with each other is advantageous as a final clamped state because it provides more uniform compression of melted resin in the cavity 12 and provides injection compression-molded articles of less strain with less compression force (clamping force).

In case where the parting surfaces of the molds 10 and 11 contact with each other, it is likely that a specified pressure may not be exerted to the melted resin in the cavity 12, with the result that molded articles may suffer from surface sink or the like, leading to failure in attaining a specified precision in dimensions.

According to the injection compression-molding method, high parallelism is secured between the molds 10 and 11 as described above.

Accordingly, even if the parting surfaces of the molds 10 and 11 do not contact with each other, a desired molded article is producible without causing variation in thickness. Thus, the injection compression-molding method provides molded articles of high-quality by rendering the parting surfaces of the movable mold and the fixed mold substantially in non-contact state with each other in a final clamped state.

It is preferable to set the distance between the parting surfaces of the movable mold 10 and the fixed mold 11 in a final clamped state in the range of 0.05 to 1 mm.

In the injection compression-molding method, it is preferable to set the pressure to be exerted to the melted resin in the cavity in compression in the range of 10 to 80 MPa, more preferably in the range of 12 to 50 MPa, and further more preferably in the range of 13 to 35 MPa. Exerting a pressure to the melted resin in the predetermined range provides injection compression-molded articles with less strain and with high precision in thickness by using less clamping force.

In the injection compression-molding method, it is preferable to set the moving distance of the mold (hereinafter, also called as "compression stroke") when the molds 10 and 11 are shifted from an intermediate clamped state to a final clamped state in the range of 1 to 4 mm, and more preferably in the range of 1 to 3 mm.

Setting the moving distance in the predetermined range provides excellent molding efficiency and desirable molding appearance with less clamping force, which is an advantage of an injection compression-molding method. The thickness of a molded article is not specifically limited. However, it is preferable to set the thickness of a molded article in the range of 0.5 to 10 mm, and more preferably in the range of 1 to 7 mm.

A preferred molded article produced by the injection compression-molding method is a molded article in which a gate is formed in a side part thereof.

There is known a phenomenon concerning a molded article in which a gate is formed in a side part thereof that the larger a molded article is, the greater the thickness variation of the molded article becomes due to tilting of the mold in filling melted resin into the cavity. Accordingly, it has been a challenging task to find a way of eliminating or suppressing variation in thickness of a molded article. The injection compression-molding method has successfully accomplished high parallelism between the molds, and thus provides means for solving the above problem.

Therefore, a molded article in which a gate is formed in a side part thereof is a particularly suitable molded article to be produced by the method.

In the injection compression-molding method, it is preferable to set a maximal projection area of a molded article at 1,000 cm$^2$ or larger, and more preferably at 2,000 cm$^2$ or larger. The upper limit of the maximal projection area is preferably 50,000 cm$^2$ or smaller, and more preferably 40,000 cm$^2$ or smaller, and further more preferably 30,000 cm$^2$ or smaller. A molded article produced by the mold having a length of resin flow of 30 cm or longer is preferable in obtaining the effect of the invention. A molded article produced by the mold having a length of resin flow of 35 cm or longer is more preferable. The upper limit of the resin flow length is 200 cm or shorter, and more preferably 180 cm or shorter.

Thermoplastic resin used in the injection compression-molding method is not specifically limited. However, the method is particularly effective by using resin of high viscosity in melting because it is highly likely that fluidity of such resin may be insufficient in injection molding of the resin into large-size molded articles.

Examples of resin having high viscosity in melting include amorphous thermoplastic resin. Thermoplastic resin used in the injection compression-molding method preferably contains amorphous resin with the content of 20 mass % or larger.

Particularly, it is preferable to contain amorphous thermoplastic resin with content of 20 mass % or larger in which the glass-transition temperature (Tg) is 100° C. or higher.

Conventionally, adding amorphous thermoplastic resin may likely to cause deterioration in properties such as impact resistance and chemical resistance in an attempt to secure high fluidity. However, according to the injection compression-molding method, large-size molded articles can be produced without deteriorating the other properties mentioned above.

It is preferable to set the ratio of amorphous thermoplastic resin relative to the total amount of resin used in molding at 25 mass % or larger, and more preferably at 30 mass % or larger. It should be appreciated that the glass-transition temperature used in the invention is a value obtained by measurement according to the method defined in the Japanese Industrial Standards (JIS) K7121.

Examples of amorphous thermoplastic resin are styrene resin (such as polystyrene, AS resin, ABS resin, ASA resin, and AES resin), acrylic resin (such as PMMA resin), polycarbonate resin, polyester carbonate resin, polyphenylene oxide resin, polysulfone resin, polyether sulfone resin, polyarylate resin, cyclic polyolefine resin, polyetherimide resin, polyamide-imide resin, polyimide resin, and polyamino bis-maleimide resin. Among these, preferable are polycarbonate resin, polyarylate resin, and cyclic polyolefine resin which are excellent in moldability and applicability in wide range. Particularly, polycarbonate resin having excellent mechanical strength is preferable.

Preferably, thermoplastic resin used in the invention may contain, as a main ingredient, polycarbonate resin having viscosity average molecular weight in the range of 12,000 to 100,000, and more preferably in the range of 14,000 to 35,000.

Thermoplastic resin used in the invention may contain thermoplastic resin other than the above resins, impact modifier, thermosetting resin, reinforcing filler, melt elasticity modifier, flame retardant, flame retarding adjuvant, char forming compound, nucleating agent, heat stabilizer, antioxidant, UV absorbent, light stabilizer, mold release agent, anti-static agent, foaming agent, fluidity modifier, antibacterial agent, photo catalytic soil repellent, lubricant, colorant, fluorescent whitening agent, light cumulative pigment, fluorescent colorant, infrared ray absorbent, photo chromic agent, light diffusive agent, and metallic agent.

Preferably, the injection compression-molding apparatus in the above embodiment is preferable in producing molded articles, for example, parts for optical instrument and precision instrument such as transparent lenses, compact discs (CDs), and floppy disks (FDs). The apparatus is more preferable in producing molded articles such as transparent members for automotive vehicles, outside panels for automotive vehicles, inner coverings for automotive vehicles, and plate-like molded articles having optical function.

According to the invention, large-size and high-quality injection molded articles having less strain and high precision in thickness are produced in a stable manner without problems in practical use with less clamping force. Particularly, the invention provides molded articles composed of amorphous thermoplastic resin having high heat resistance. Examples of the molded articles to be produced by the apparatus include transparent members for automotive vehicles (glazing members, headlamp lenses, solar cell covers, windscreens, and information-display-type instrumental panels). Particularly, lazing members for automotive vehicles (e.g., front-door windows, rear-door windows, quarter windows, rear windows, and backdoor windows, as well as sun roofs and roof panels) are preferable examples of molded articles.

As mentioned above, according to the invention, provided are an injection compression-molding method capable of producing transparent members for automotive vehicles of desired quality, and such transparent members for automotive vehicles.

Transparent members for automotive vehicles can be used in a state that an outer layer such as a hard coat is formed on the surface thereof. It is possible to produce a multi-layered molded article. However, it is preferable to produce a single-layered transparent member for automotive vehicle and to apply a surface coating such as hard coat onto the surface of the molded article.

Further, according to the method, provided are outside panels for automotive vehicles. Generally, outside panels for automotive vehicles are large-size molded articles and require good external appearance and less strain even though they are opaque.

Further, according to the method, provided are integral molded articles in which a glazing member and an outside panel for automotive vehicle are jointed together, for example.

Examples of outside panels for automotive vehicles include back panels, fenders, door panels, roof panels, and trunk lids. Integral products in which the outside panel and a window (e.g. front window, side window, rear window, and roof window) are jointed together are also producible by the injection compression-molding method. This invention provides an injection compression-molding method of producing such molded articles.

Further, according to the injection compression-molding method, producible are plate-like molded articles having optical function, which require high transferability and less strain (such as Fresnel lenses, light diffusive sheets, lenticular lens seeds (sic), prism sheets, and lens arrays) and yet are free from problems in practical use.

As mentioned above, according to the invention, provided are thermoplastic resinous articles in each of which a thickness variation is 50 μm or less and a maximal projection area is 2,000 cm² or larger and a gate is formed in a side part thereof.

It has been difficult to produce molded articles which have high precision in thickness variation and high-quality and yet is free of problems in practical use in producing large-size molded articles in which a gate is formed in a side part thereof. This is because the mold is likely to be tilted in filling melted resin into the cavity at the time of injection compression molding. Further, it is often the case that some physical or chemical property has to be sacrificed in order to secure good moldability in the case where injection compression-molding method is not adopted.

According to the invention, molded articles free of the above drawbacks are produced.

Various surface treatments such as various coatings (hard coating, water repelling coating, oil repelling coating, UV absorbing coating, infrared ray absorbing coating, abrasion resistive coating, anti-chipping coating, etc.), painting, printing, and metallizing (such as plating and vapor deposition) are applicable to molded articles producible by the injection compression-molding method. It should be appreciated that the coatings may include primer coating when need arises to do so. These surface treatments can be desirably applied onto the molded articles even if the molded articles are of a large size.

The injection compression-molding method may be used in combination with a known molding method. For example, it is possible to combine the method with the method disclosed in Japanese Examined Patent Publication No. 5-19443.

Further, the molding method may be used in combination with gas-assist injection molding, foaming molding (including injection of fluid in a supercritical condition), insert molding, in-mold coating molding, high-speed heating and cooling molding, insulated molding, two-color molding, sandwich molding, and ultra high-speed injection molding.

EXAMPLES

Hereinafter, the invention and the effects thereof are described in further detail with reference to the examples and comparative examples. It should be appreciated that the invention is not constrained by these examples.

(Evaluation Items)

(1) Outer Appearance

Occurrence of flow mark (i) and surface sink (ii) with respect to the molded articles was evaluated based on visual observation. The results of observation are shown in Table 1.

TABLE 1

| | Items | Ex. 1 | C. Ex. 1 | C. Ex. 2 | Ex. 2 | C. Ex. 3 |
|---|---|---|---|---|---|---|
| Molding Method | Injection Compression | YES | YES | NO | YES | YES |
| | Parallelism | YES | NO | — | YES | NO |
| Evaluation of | (1) Outer Appearance | ○ | ○ | ○ | ○ | ○ |
| Molded Article | (2) Residual Strain | ○ | Δ | X | — | — |
| | (3) Variation in Gate-side | +10 | +80 | +10 | +14 | +75 |
| | Thickness (μm) Flow-end | +1 | −70 | −8 | +2 | −70 |
| | (4) Continuous Molding | — | — | — | ○ | X |

○ defect not observed X: defect observed (2) Residual Strain

Figure 7C:
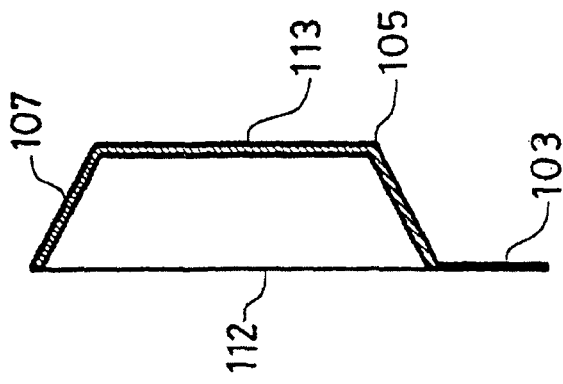
FIG. 7C is a sectional view taken along the line B—B in FIG. 7A.
Figure 7A:
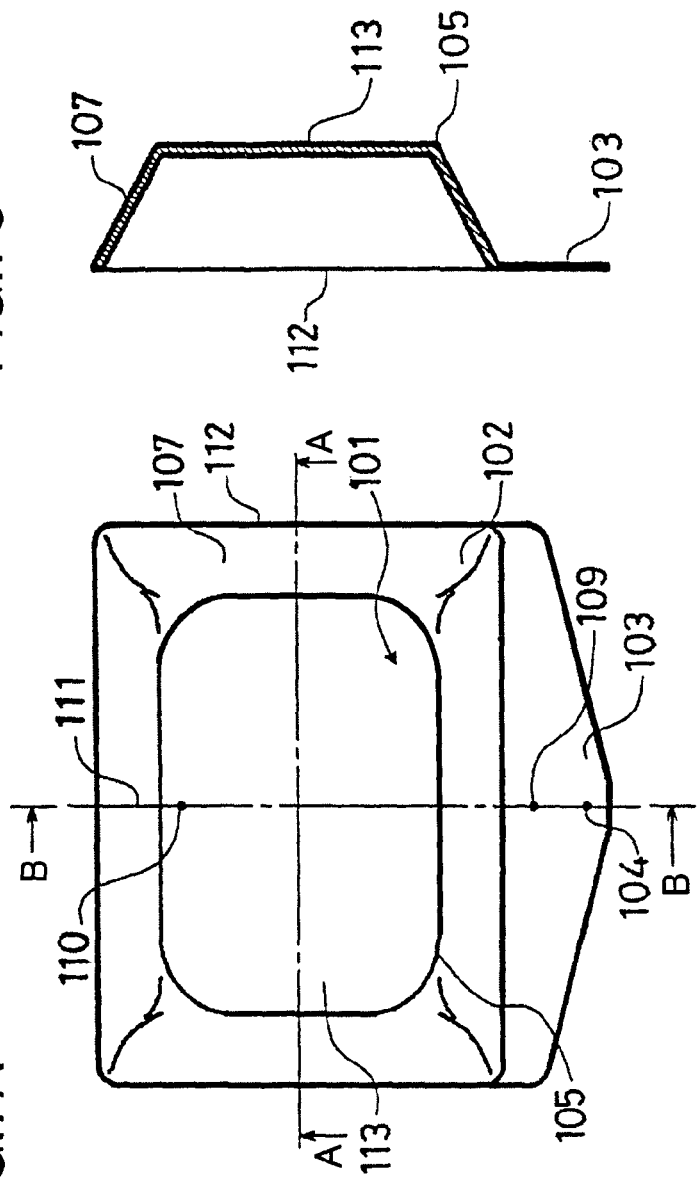
FIG. 7A is a front view of a molded article produced in Example 1.
Figure 7B:
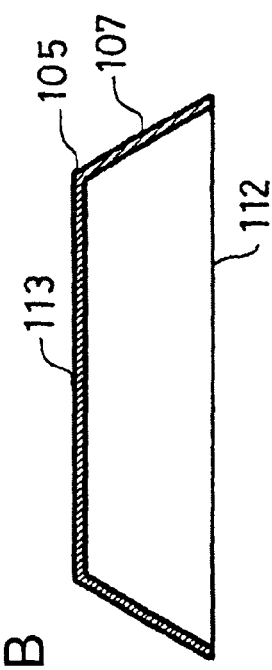
FIG. 7B is a sectional view taken along the line A—A in FIG. 7A.

After producing 30 molded articles as shown in FIGS. 7A through 7C, residual strain was observed with respect to all the molded articles. FIGS. 7A through 7C are diagrams showing an injection compression-molded article produced in Example 1. FIG. 7A is a front view of the molded article. FIG. 7A is a front view of the molded article, and shows the view of the molded article that is projected against the platen plane at the time of molding. Accordingly, the projection area corresponds to the maximal projection area of the molded article. In the drawing of FIG. 7A, a gate is located at a lower part of the molded article. FIG. 7B is a sectional view taken along the line A—A in FIG. 7A, wherein the line A—A is aligned with a centerline 111. FIG. 7C is a sectional view taken along the line B—B in FIG. 7A.

More specifically, the molded article shown in FIGS. 7A through 7C has a main body 101 of a rectangular shape in front view. The article main body 101 has a periphery bottom 112, and a gate 103 extending along one side of the periphery bottom 112. The article main body 101 has dimensions such that the longer side of the periphery bottom 112 is 55 cm, and the shorter side of the periphery bottom 112 is 38 cm with a height of 12 cm. The article main body 101 has a trapezoidal or trough shape in longitudinal section. The article main body 101 has a peripheral surface 107. The peripheral surface 107 has a configuration such that the area thereof decreases as the peripheral surface 107 is directed from the perimeter of the periphery bottom 112 toward an upper surface 113. Ridges 102 at four corners of the peripheral surface 107 each have a curved shape. A ridge 105 defined by the peripheral surface 107 and the upper surface 113 is bent at four corners of the upper surface 113. A nozzle portion 104 is formed at a tip end of a hot runner having a diameter of 3 mm in such a state that the nozzle portion 104 is aligned with the centerline 110 of the gate 103.

In the thus-constructed molded article, a thickness measuring point 110 is provided at a flow-end side of the gate 103 on the centerline 111 of the upper surface 113 of the article main body 101, and a thickness measuring point 109 is provided at an inlet side of the gate 103 (namely, gate-side) on the centerline 111. The thickness measuring point 110 at the flow-end side is located away from the ridge 105 by 2 cm. The thickness measuring point 109 at the gate-side is located away from a center of the nozzle portion 104 of the hot runner by 5 cm.

Observation was carried out by disposing two polarized plates parallel with each other and vertically away from each other with the respective polarized planes thereof normal to each other, and by placing the molded article between the two polarized plates. A light source located below the lower-side polarized plate was used as a light source for the observation. The observation was carried out by visual observation from the top of the upper-side polarized plate. Evaluation was carried out based on the color change between optical fringe patterns, compression density unevenness, and presence or absence of uneven shaded portion. The results of the observation are shown in Table 1.

○: No large strain was observed, and no uneven shaded portion was observed.

Δ: No large strain was observed, but some uneven shaded portion was observed.

X: Large strain was observed.

The molded article with less color change between optical banding patterns and with less compression density unevenness was classified as a molded article having less optical strain.

(3) Variation in Thickness

The thickness of the molded article was measured with use of a micrometer at specified points, namely, on the gate-side and the flow-end side to obtain a thickness variation at the respective points. The measurement was carried out with respect to all the thirty pieces of the molded articles, and the average value of the thickness variation was calculated with respect to each measured point. As a result of the measurement, in all the molded articles, the thickness variation did not deviate from the average value by 20 μm or larger. The thickness variation was calculated by estimating the thickness of the molded article in its inherent state based on the mold dimensions and mold shrinkage ratio in thickness direction and by calculating a difference between the estimated thickness and the measured thickness. The results of the measurement are shown in Table 1. In Table 1, the mark "+" indicates that the measured thickness is larger than the estimated thickness, and the mark "−" indicates that the measured thickness is smaller than the estimated thickness.

(4) Continuous Moldability

Molding as shown in Example 2 was carried out in an attempt to produce 2,000 molded articles continuously. The continuous moldability was evaluated as follows. The mark ○ indicates that stable continuous molding could be carried out. The mark X indicates that continuous molding was difficult. The results of the continuous molding are shown in Table 2. In the case where the parallelism retaining mechanisms were not activated, abnormal noise was generated from the mold when the continuous molding was proceeded up to a stage of producing about 100 molded articles. The continuous molding was suspended at this stage because it was judged that generation of such abnormal noise would lead to breakage of the mold.

(Production of Polycarbonate Resin)

PC-1: 99.87 parts by mass of polycarbonate resin powder having viscosity-average molecular weight of 22,500 (Panlite L-1225WP produced by Teijin Chemicals Ltd.), 0.03 parts by mass of Sandstab P-EPQ (produced by Sandoz Pharmaceutical Limited), and 0.1 parts by mass of pentaerythritol tetrastearate were mixed together, and the mixture was extruded by a twin-screw extruder of a same-direction rotational type equipped with a vent (model TEX-α produced by Japan Steel Works, Ltd., screw diameter: 30 mm) at screw rotating rate: 150 rpm, cylinder temperature: 280° C., and vent sucking pressure: 3 kPa to yield pellets of polycarbonate resin (PC-1). (Viscosity-average molecular weight of the pellets was 22,400.)

PC-2: 30 parts by mass of aromatic polycarbonate resin (Panlite L-1250WP produced by Teijin Chemicals Ltd.), 30 parts by mass of PBT resin (1100211S produced by Chang Chun Plastics Co., LTD.), 10 parts by mass of compatible agent (TKS-7300 produced by Kuraray Co., Ltd.), 25 parts by mass of talc (Hitalc Ultra5c produced by IMI Fabi S.p.A), 5 parts by mass of heat stabilizer of styrene thermoplastic elastomer (SEPTON 2005 produced by Kuraray Co., Ltd.), and 0.2 parts by mass of phosphate heat stabilizer (Adeka Stab PEP-8 produced by Asahi Denka Kogyo Kabushild Kaisha) were mixed together by a tumbler to obtain homogenized mixture. The mixture was extruded according to the same manner and under the same conditions as in Example 1 to yield pellets of polycarbonate alloy resin (PC-2).

Example 1

The polycarbonate resin pellets PC-1 were dried at 120° C. for 5 hours by a hot air dryer, and injection molding was performed by an injection molding apparatus J1300E-C5 produced by Japan Steel Works, Ltd. with cylinder diameter: 110 mm and clamping force: 12,700 kN (produced according to the specifications in which the hydraulic circuit and the control system were so modified as to enable compression molding). The parallelism retaining mechanism 20 was mounted at four corners of the mold attaching plates as shown in FIG. 1. Micrometers were attached as the head members 24. Parallelism as preparatory operation was implemented to secure parallelism between the molds when the molds were set to a specified intermediate clamped state. Then, injection compression-molding was carried out to produce a molded article having the dimensions of about one-half of a glazing member for automotive vehicle as shown in FIG. 7 (projection area of article: about 2,100 cm$^2$, thickness of article: about 4.2 mm) in the conditions of cylinder temperature: 300° C., hot runner temperature: 310° C.; mold temperature: 100° C., filling time: 6.5 sec.).

Other conditions for molding were as follows. Injection rate: 20 mm/sec., period for bringing the molds from an intermediate clamped state to a final clamped state: 2 sec., period during which resin injecting and clamping are carried out simultaneously: 0.5 sec., pressure (maximal pressure) to be exerted to the resin in the cavity: 25 MPa, period for retaining the maximal pressure: 40 sec., moving distance (advancing stroke) of the mold from the intermediate clamped state to the final clamped state: 2 mm, and cooling period: 50 sec. The parallelism was carried out by setting a retaining pressure required for the parallelism retaining mechanisms 20 in advance based on the clamped position and tilted angle of the mold at the time of molding, and by employing time-controlling method based on the contents shown in Table 2.

TABLE 2

| Period from time when contact unit contacted positioning cylinder | Period of applying pressure (sec.) | Retaining pressure for parallelism retaining mechanisms (MPa) Position of parallelism retaining mechanisms (*1) | | | |
|---|---|---|---|---|---|
| | | rear-side upper part | front-side upper part | rear-side lower part | front-side lower part |
| 0–3.0 | 3.0 | 1.5 | 1.5 | 0 | 0 |
| 3.0–4.5 | 1.5 | 2.3 | 2.3 | 0 | 0 |
| 4.5–6.2 | 1.7 | 2.5 | 2.5 | 0 | 0 |
| 6.2–6.9 | 0.7 | 2.7 | 2.7 | 0 | 0 |
| 6.9–7.6 | 0.7 | 4.0 | 4.0 | 0 | 0 |
| 7.6–8.1 | 0.5 | 7.0 | 7.0 | 3.3 | 3.3 |
| 8.1–17.1 | 9.0 | 8.0 | 8.0 | 3.3 | 3.3 |
| 17.1 to finish time | — | 7.0 | 7.0 | 3.0 | 3.0 |

*1 front-side and rear side are defined as viewed from control panel

The first column in Table 2 shows the period (unit: sec.) elapsed from the time when the contact unit 21 (head member 24) contacted the positioning cylinder 22 (cylinder rod 22a) in one parallelism retaining mechanism. Injection of resin was initiated at 3 seconds after the contact.

The value of the pressure sensor disposed at the central part of the cavity surface of the movable mold opposing the cavity was read and set as the pressure which has been exerted to the resin in the cavity. The value on the pressure sensor was substantially the same as the pressure set for clamping the molds. The cavity surface of the movable mold was set away from the parting surface of the fixed mold by 0.3 mm at a final advanced position. This non-contact state was defined as a final clamped state between the molds. A hot runner of a valve-gate type produced by Mold Masters Ltd. (diameter: 3 mm) was used as a runner. Immediately after completion of the filling, the valve gate of the hot runner was closed so that melted resin may not flow back to the cylinder through the gate at the time of compression molding. The molding cycle was about 120 sec. (Several seconds as variation should be tolerated in view of the fact that the molded article is manually taken out from the molds.) The molded article produced by the above method showed less residual strain and good outer appearance. The results of evaluation are shown in Table 2 (sic).

Comparative Example 1

Injection compression-molding was carried out in the same manner as in Example 1 except that the parallelism retaining mechanisms were not activated and parallelism aligning operation was not performed. The results of evaluation are shown in Table 2 (sic).

Comparative Example 2

Molding was carried out in the same conditions as in Example 1 except that ordinary injection molding was performed in place of injection compression-molding. The results of evaluation are shown in Table 2 (sic).

Example 2

Figure 8B:
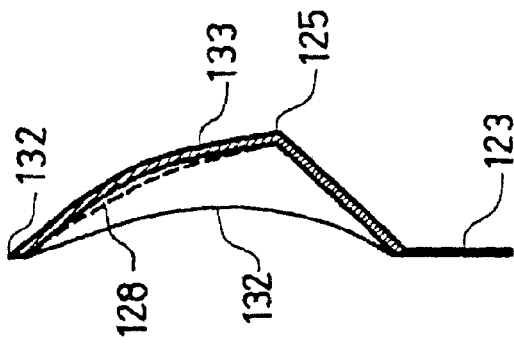
FIG. 8B is a sectional view taken along the line C—C in FIG. 8A.
Figure 8A:
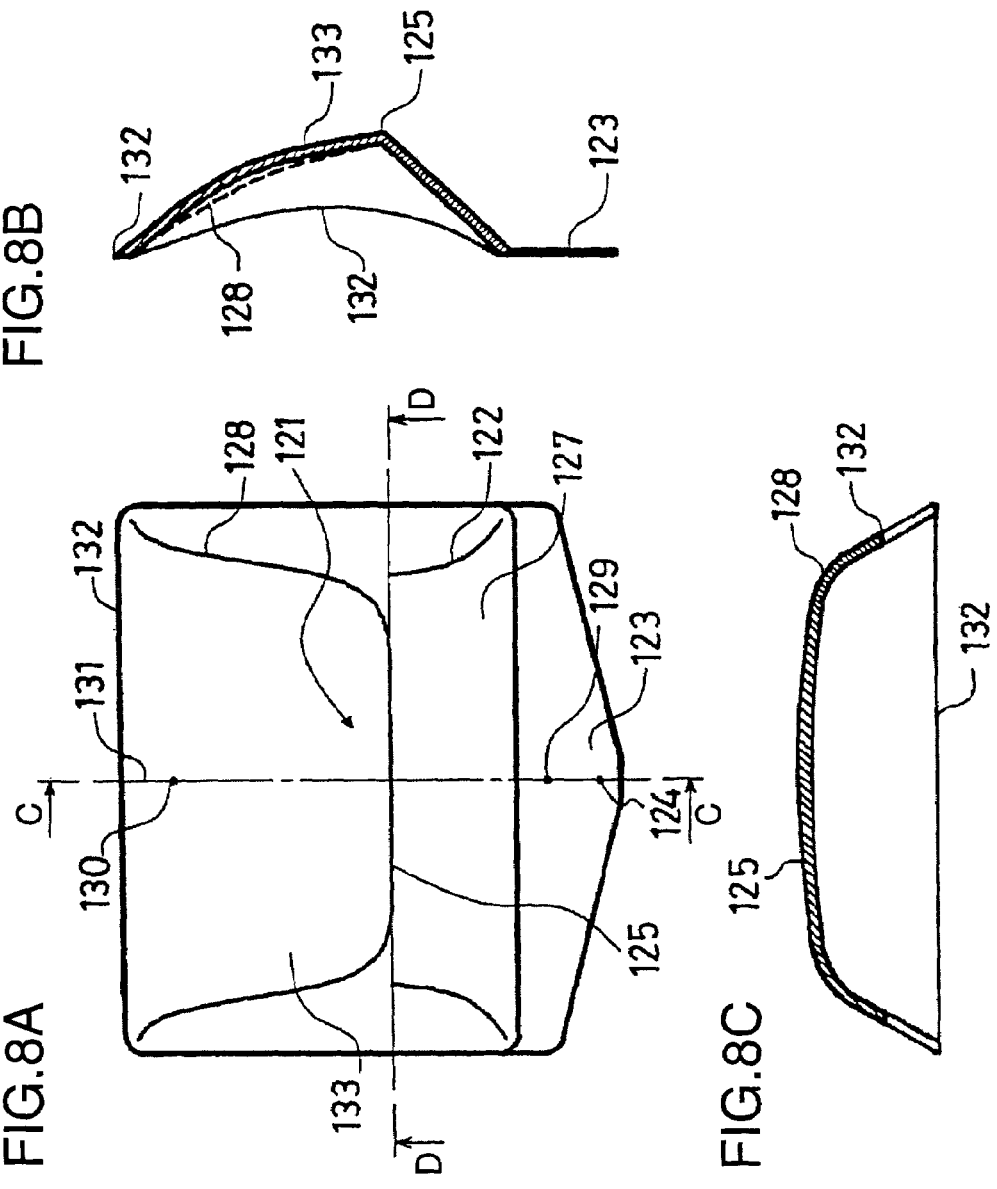
FIG. 8A is a front view of a molded article produced in Example 2.
Figure 8C:
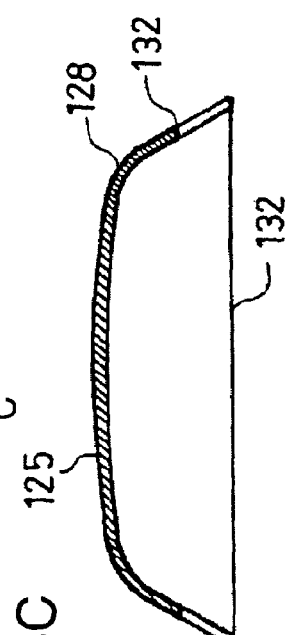
FIG. 8C is a sectional view taken along the line D—D in FIG. 8A.
Figure 9:
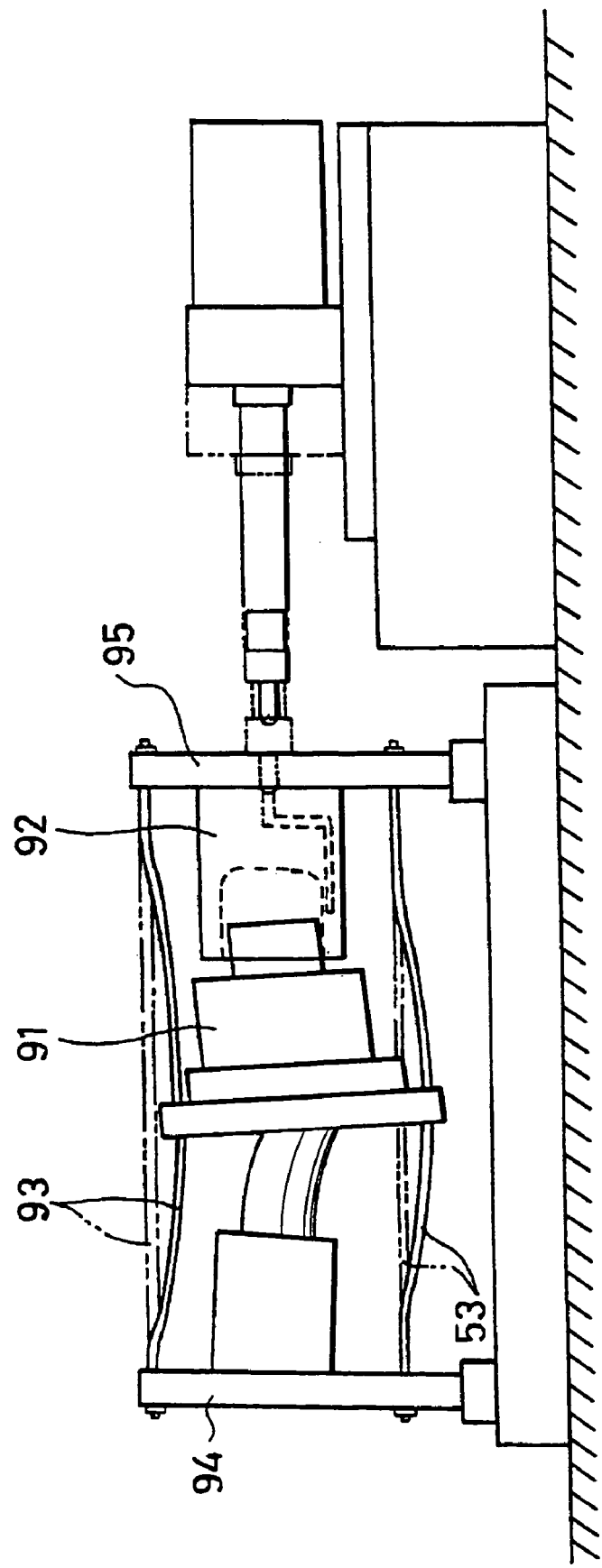
FIG. 9 is an explanatory diagram showing an injection molding apparatus of prior art.

The polycarbonate alloy resin pellets PC-2 were dried at 120° C. for 5 hours by a hot air dryer, and a molded article having dimensions (projection area of article: about 2,100 cm², thickness of article: about 3 mm) having dimensions of about one-half of a rear door for automotive vehicle as shown in FIGS. 8A through 8C was produced by using the same apparatus as in Example 1 (in a state that the parallelism retaining mechanisms were activated).

FIGS. 8A through 8C are diagrams showing the molded article produced in Example 2. FIG. 8A is a front view of the molded article. FIG. 8A shows the front view of the molded article that is projected against the platen plane at the time of molding. Accordingly, the projection area corresponds to the maximal projection area of the molded article.

It should be appreciated that a gate is located at a lower part of the molded article. FIG. 8B is a sectional view taken along the line C—C in FIG. 8A, wherein the line C—C is aligned with a centerline 131. FIG. 8C is a sectional view taken along the line D—D in FIG. 8A.

More specifically, the molded article shown in FIGS. 8A through 8C has a main body 121 of a rectangular shape in front view. The article main body 121 has a periphery bottom 132, and a gate 123 extending from one side of the periphery bottom 132.

The article main body 121 has dimensions such that the longer side of the periphery bottom 132 is 55 cm, and the shorter side of the periphery bottom 132 is 38 cm, and the height is 12 cm.

The surface defined by the periphery bottom 132 of the article main body 121 has a bulging shape as shown in FIG. 8B.

An upper surface 133 of the article main body 121 convergingly rises from the other side opposite to the side of the periphery bottom from which the gate 123 extends so as to have a bulging shape.

The top of the upper surface 133 and the periphery bottom 132 are connected with each other via a planar ramped surface 127.

Ridges 122 at corner portions of the ramped surface 127 each have a curved shape, and a ridge 125 defined by the ramped surface 127 and the upper surface 133 is bent.

A nozzle portion 124 is formed at a tip end of a hot runner having a diameter of 3 mm in such a manner that the nozzle portion 124 is aligned with the centerline 131 of the gate 123.

In the thus-constructed molded article, a thickness measuring point 130 is provided at a flow-end side on the centerline 131 on the upper surface 133 of the article main body 121, and a thickness measuring point 129 is provided at the inlet side of the gate 123 (namely, gate-side) on the centerline 131.

The thickness measuring point 130 at the flow-end side is located away from the ridge 132 by 6.5 cm. The thickness measuring point 129 at the gate-side is located away from a center of the nozzle portion 124 of the hot runner by 5 cm.

The above molded article has a gate in a side part thereof and was produced by injection compression-molding in the conditions of cylinder temperature: 270° C., hot runner temperature: 290° C.; mold temperature: 120° C., and filling time: 5.5 sec.

Other conditions for molding were as follows. Injection rate: 20 mm/sec., period for bringing the molds from an intermediate clamped state to a final clamped state: 2 sec., period during which resin injecting and clamping are carried out simultaneously: 0.5 sec., pressure (maximal pressure) to be exerted to the resin in the cavity: 30 MPa, period for retaining the maximal pressure: 40 sec., moving distance (advancing stroke) of the mold from the intermediate clamped state to the final clamped state: 2 mm, and cooling period: 45 sec.

The parallelism was carried out based on the contents shown in Table 2. The conditions where the molds are set to a substantially non-contact final clamped state and the specifications regarding the hot runner device were the same as in Example 1. The molding cycle was about 110 sec. (Several seconds as variation should be tolerated in view of the fact that the molded article is manually taken out from the molds.) The molded article produced by the above method showed good outer appearance. The results of evaluation are shown in Table 1.

Comparative Example 3

Injection compression-molding was carried out in the same manner as in Example 2 except that the parallelism retaining mechanisms were not activated and parallelism aligning operation was not performed. The results of evaluation are shown in Table 1.

Example 3

The polycarbonate resin pellets PC-1 were dried at 120° C. for 5 hours by a hot air dryer, and a Fresnel lens having a convex part of about 25 μm in height (projection area of article: about 1,100 cm$^2$, thickness of article: about 0.7 mm) was produced by using the same apparatus as in Example 1 (in a state that the parallelism retaining mechanisms were activated).

Cylinder temperature: 310° C., and hot runner temperature: 320° C. were set as the molding conditions. Further, the following high-speed heating-and-cooling molding was carried out while setting the base temperature of the mold at 100° C.

According to the high-speed heating-and-cooling molding, resin filling was terminated under the rapid heating conditions where the highest temperature of the cavity of the molds reaches 200° C. with use of a heater which follows a cooling process where the molds were rapidly cooled by passing a refrigerant of about 10° C. with use of a chiller unit. The resin filling time was 2.5 sec. The other molding conditions were substantially the same as in Example 2. The molded article produced according to this method showed less residual strain and good brightness.

EXPLOITATION IN INDUSTRY

According to an aspect of the invention, since high parallelism is retained between the molds in an intermediate clamped state by the parallelism retainer, melted resin is filled substantially uniformly into the cavity.

In the above arrangement, the melted resin in the cavity is compressed substantially uniformly when the molds are clamped to each other again from the intermediate clamped state to a final clamped state. Accordingly, molded articles produced after cooling the melted resin have sufficiently small residual strain, thereby providing molded articles of high-quality.

According to another aspect of the invention, since high parallelism is ensured between the molds when the molds are shifted from an intermediate clamped state to a final clamped state, drawbacks such as abrasion between the molds and breakage of the molds are securely prevented.

According to yet another aspect of the invention, even if the parts in the apparatus are worn out due to repeated use, high-quality molded articles are producible for a long term since the parallelism retainer serves to securely maintain high parallelism between the molds in an intermediate clamped state.

According to still another aspect of the invention, the apparatus is comprised of hydraulic pressure setting sections each operative to feed and discharge hydraulic fluid so as to control the corresponding positioning cylinder of each parallelism retaining mechanism to expand and contract the cylinder rod and to retain each parallelism retaining mechanism at a specified retaining pressure; and a control system which is operative to set at least one of the retaining pressure and the hydraulic fluid ejecting rate in each hydraulic pressure setting section individually so as to minimize an influence of load variation to the parallelism at the time of re-clamping when such a load variation is generated by the melted resin injected to the cavity of the molds in an intermediate clamped state. With this arrangement, high parallelism between the molds is securely maintained during the re-clamping operation.

As a result of the above operation, high-quality molded articles are producible, and drawbacks such as abrasion between the molds are securely prevented.

According to another aspect of the invention, even with use of a resin containing amorphous thermoplastic resin of 20 mass % or larger, which may likely to deteriorate properties such as impact resistance and chemical resistance in an attempt to secure moldability according to the prior art, high-quality molded articles which are excellent in the above properties are producible for a long term.

In the case where transparent members for automotive vehicles are to be produced as injection compression-molded articles according to the invention, resin is usable to produce transparent molded articles in place of a transparent member composed of glass.

According to yet another aspect of the invention, provided is a novel glazing member which has excellent impact resistance, is lightweight, and has a sophisticated design with a seemingly 3D planar configuration capable of forming an exceedingly small curvature or an edge-like portion, with less strain and with high precision in thickness and without problems in practical use.

In the case where outside panels for automotive vehicles are to be produced as injection compression-molded articles according to the invention, producible are outside panels for automotive vehicles having a remarkably large size compared with molded articles producible by the prior art. Accordingly, the invention provides a relatively large molded article substantially equivalent to a number of relatively small molded articles producible by the prior art, and provides a molded article having a wider area as an integral part. Therefore, production efficiency is improved, and resinous outside panels for automotive vehicles are produced with reduced cost and without problems in practical use.

In the case where plate-like molded articles having optical function are to be produced as injection compression-molded articles according to the invention, plate-like molded articles having optical function such as Fresnel lenses which require high transferability and less strain are provided without problems in practical use.

In the case where produced are thermoplastic resinous molded articles each of which has a gate in a side part and has a thickness variation of 50 μm or less and a maximal projection area of 2,000 cm$^2$ or larger according to the invention, high-quality and large-size molded articles with less strain and high precision in thickness are provided.

The invention claimed is:

1. An injection compression-molding method for producing a molded article using an injection compression molding apparatus comprising two mold supporting plates facing each other, wherein at least one of the two mold supporting plates is movable toward and away from the other of the two mold supporting plates, and wherein each of the mold supporting plates supports a mold, a clamping mechanism for moving at least one of the two mold supporting plates toward and away from the other of the two mold supporting plates so as to set the molds to an intermediate clamped state for injection of melted resin into a cavity defined by the molds and set the molds to a final clamped state during or after the injection of the melted resin, and a plurality of parallelism retaining mechanisms arranged around the molds for retaining parallelism between the molds in the intermediate clamped state, wherein each parallelism retaining mechanism includes a positioning cylinder attached on the one mold supporting plate and extending toward the other mold supporting plate, the positioning cylinder having a rod expandable in a mold clamping direction, and a contact unit attached on the other mold supporting plate and extending toward the one mold supporting plate, further comprising a fine adjuster attached at a distal end portion of the contact unit and operative to move toward and away from the positioning cylinder in the mold clamping direction so as to come into an adjusted specified position with respect to the positioning cylinder, the method comprising a step of setting all of the parallelism retaining mechanisms at a specified distance by operating the distal end portion of the contact unit before starting the molding operation.

2. The method according to claim 1, wherein the melted resin contains an amorphous thermoplastic resin of 20 mass % or more.

3. The method according to claim 1, wherein each of the molds has a parting surface, the parting surfaces being in a substantially non-contact state with each other.

4. An injection compression-molding apparatus for producing a molded article, comprising:
   two mold supporting plates facing each other, wherein at least one of the two mold supporting plates is movable toward and away from the other of the two mold supporting plates, and wherein each of the mold supporting plates supports a mold;
   a clamping mechanism for moving at least one of the two mold supporting plates toward and away from the other of the two mold supporting plates so as to set the molds to an intermediate clamped state for injection of melted resin into a cavity defined by the molds and set the molds to a final clamped state during or after the injection of the melted resin; and
   a plurality of parallelism retaining mechanisms arranged around the molds for retaining parallelism between the molds in the intermediate clamped state,
   wherein each parallelism retaining mechanism includes a positioning cylinder attached on the one mold supporting plate and extending toward the other mold supporting plate, the positioning cylinder having a rod expandable in a mold clamping direction, and a contact unit attached on the other mold supporting plate and extending toward the one mold supporting plate, further comprising a fine adjuster attached at a distal end portion of the contact unit and operative to move toward and away from the positioning cylinder in the mold clamping direction so as to come into an adjusted specified position with respect to the positioning cylinder, whereby the distal end portion of the contact unit comes into contact with the rod of the corresponding positioning cylinder at a regulated position to retain the parallelism between the molds.

5. The apparatus according to claim 4, wherein the fine adjuster at the distal end portion of the contact unit is movable toward and away from the positioning cylinder by rotating the fine adjuster.

6. The apparatus according to claim 4, further comprising:
   hydraulic pressure setting sections each of which corresponds to the positioning cylinder of each parallelism mechanism, each hydraulic pressuresetting section being operative to feed and discharge hydraulic fluid so as to expand and contract the rod of the positioning cylinder toward and away from the contact unit at a specified retaining pressure; and
   a control system which is operative to set at least one of the retaining pressure and a hydraulic fluid discharging rate in each hydraulic pressure setting section individually so as to minimize an influence of load variation to the parallelism at the time of re-clamping in the intermediate clamped state.

* * * * *